(No Model.)

L. HOLT.
PNEUMATIC TIRE.

No. 497,575. Patented May 16, 1893.

WITNESSES:

INVENTOR:
Leopold Holt.
per: Robt. Ed. Phillips.
Attorney.

United States Patent Office.

LEOPOLD HOLT, OF LONDON, ENGLAND.

PNEUMATIC TIRE.

SPECIFICATION forming part of Letters Patent No. 497,575, dated May 16, 1893.

Application filed August 22, 1892. Serial No. 443,819. (No model.) Patented in England August 1, 1891, No. 13,076.

*To all whom it may concern:*

Be it known that I, LEOPOLD HOLT, a subject of the Queen of Great Britain, residing at South Kensington, London, England, have invented a new and useful Improvement in Pneumatic Tires, (for which I have obtained a patent in Great Britain, No. 13,076, bearing date August 1, 1891,) of which the following is a specification.

My invention relates to an improved method of attaching the covers or jackets of pneumatic tires to the rims of wheels, the object being to fix or lock the said covers or jackets to the rims in a more reliable and secure manner than at present obtains, and at the same time to provide for the ready and facile removal of the cover or jacket for the purpose of getting at the air tube.

The invention consists in the use of a secondary or auxiliary air tube for the purpose of fixing or binding the cover or jacket of the tire to the rim, the said air tube being independent of the main air tube used to inflate the tire and acting only for the purpose of binding or holding the cover or jacket to the rim.

Figure 1:
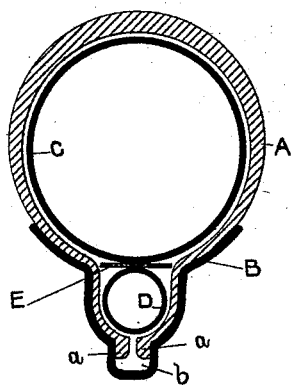
Figure 2:
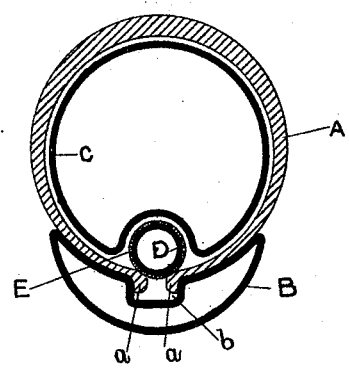
Figure 3:
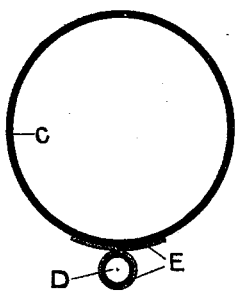
Figure 7:
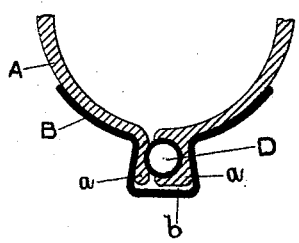
Figure 6:
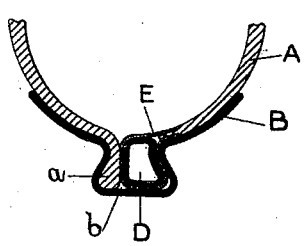
Figure 4:
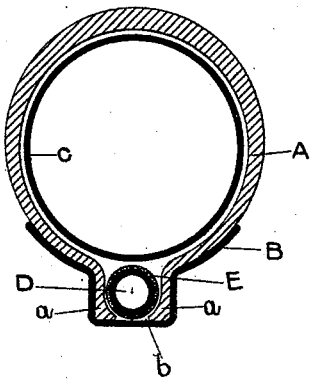
Figure 5:
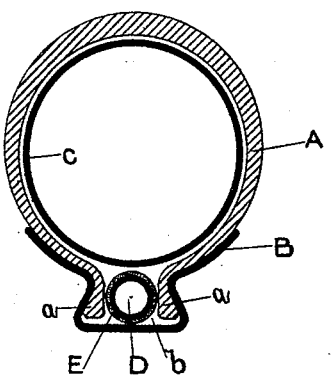

Referring to the accompanying drawings in which like letters indicate corresponding parts in the several views: Figure 1 is a view in transverse section of a tire in which the auxiliary air tube is used to bind or lock the enlarged edges of the cover or jacket in a groove in the center of the rim. Fig. 2 is a view in transverse section of a modification of the construction shown by Fig. 1. Fig. 3 is a view in transverse section of a main air tube having the auxiliary air tube formed on or fixed to it. Fig. 4 is a view in transverse section of a tire in which the auxiliary air tube is used to fit between the enlarged edges of the cover or jacket and force them to engage with the sides of the central groove in the rim. Fig. 5 is a view in transverse section of a modification of the construction shown by Fig. 4. Fig. 6 is a broken view in transverse section of a tire in which the auxiliary air tube is formed in or on or attached to one edge of the cover or jacket, and Fig. 7 is a similar view showing a modification thereof.

In the drawings A indicates the outer cover or jacket, B the rim of the wheel, C the main air tube for inflating the tire, and D the auxiliary air tube for fixing or binding the cover to the rim. The outer cover or jacket A consists of a band of rubber or rubber compound reinforced with canvas or cloth in the well-known manner. The edges $a$, $a$, of the cover are shaped to adapt them to engage with the sides of a central groove $b$ in the rim B of the wheel which may be either of the solid or hollow type. The main air tube C is of the usual construction—made of pure rubber—and is provided with the usual valve for inflation and deflation. The auxiliary air tube D is either made of rubber only as shown by Fig. 1, or of rubber reinforced with canvas or other fabric as shown by Figs. 2, 3, 4, 5 and 6, and it is provided with any suitable type of valve for inflation and deflation. This auxiliary air tube may either be used independent of the other parts of the tire as shown by Figs. 1, 2, 4 and 5, or it may be formed in, or on, or attached to, one of the edges $a$ of the cover or jacket A as shown by Figs. 6 and 7, or it may be formed on or attached to the main air tube C as shown by Fig. 3. When the auxiliary air tube D is made of rubber only it is confined to expand inwardly only by means of a non-stretchable band E placed around it between it and the main air tube as shown by Fig. 1. By inclosing the auxiliary air tube D in a canvas pocket E or combining a canvas fabric E with it as shown by Figs. 2, 3, 4, 5, and 6 the non-stretchable band E may be dispensed with, as the canvas pocket or fabric encircling the air tube D answers the same purpose, viz., to prevent its outward expansion. The auxiliary air tube D may be attached to the main air tube C as shown by Fig. 3 in which case the non-stretchable band and canvas pocket or fabric E are combined together to inclose the air tube D. As a modification the auxiliary air tube D may be attached to one edge $a$ of the cover A as shown by Fig. 6, or it may be fitted in a recess $a'$ formed in one of the edges $a$ of the cover A and when inflated to jam or force the said edges $a$, $a$, of the cover apart to lock them to the rim.

By the use of a separate or auxiliary air tube for locking or fixing the cover to the wheel rim, the main air tube can be inflated to any desired pressure to suit the weight of the rider or the surface of the road, an impossibility when one air tube is used for the two purposes, as the first consideration is to render the cover secure on the rim which requires an internal pressure far too great to give the greatest comfort and speed to riders of average weight.

I am aware that it is not broadly new to use enlarged edges on covers or jackets for the purpose of engaging with a groove or grooves in the rims of wheels, and I do not therefore claim such as my invention but What I do claim, and desire to secure by Letters Patent, is—

The combination, with a circumferentially grooved rim, of a tire-cover provided with edges adapted to engage with the said grooved rim, an inflatable air-tube for extending the cover, and a fastening device consisting of an inflatable tube formed separate from the said cover and air-tube and operating to lock the edges of the cover in position when expanded, substantially as set forth.

LEOPOLD HOLT.

Witnesses:
N. WHATTLER,
G. G. CLARK.